United States Patent [19]

Takeda

[11] 3,719,845

[45] March 6, 1973

[54] DISC ROTOR

[75] Inventor: Naozi Takeda, Osaka, Japan

[73] Assignee: Matsushita Electric Industrial Co., Ltd., Osaka, Japan

[22] Filed: Jan. 26, 1972

[21] Appl. No.: 220,934

[30] Foreign Application Priority Data

Jan. 27, 1971 Japan ....................................45/2698

[52] U.S. Cl.....................................................310/268

[51] Int. Cl....................................................H02k 1/22

[58] Field of Search................................310/268, 207

[56] References Cited

UNITED STATES PATENTS

| | | | |
|---|---|---|---|
| 2,847,589 | 8/1958 | Haydon | 310/268 X |
| 2,853,637 | 9/1958 | Ishikawa | 310/268 |
| 3,054,011 | 9/1962 | Silverschotz et al. | 310/268 |
| 3,239,705 | 3/1966 | Kavanaugh | 310/268 |
| 3,296,474 | 1/1967 | Henry-Baudot | 310/268 |
| 3,382,570 | 5/1968 | Knapp et al. | 310/268 |

*Primary Examiner*—D. F. Duggan

*Attorney*—Richard K. Stevens et al.

[57] ABSTRACT

A plurality of armature elements having the same coil pattern are stacked one upon another, mounted on a shaft with each element angularly displaced from the adjacent one by an angle equal to that subtended by one segment of the commutator with respect to the center of the shaft and connected with one another to form a wave winding so that a disc rotor consisting of a plurality of similar armature elements may be provided, each of the armature elements comprising a disc-like thin insulator film and spiral conductor coils formed through printed circuit technique on both sides of the insulator film disc, the number of the spiral coils on one side of the disc being the same as that on the other side of the disc, the number being also the same as that of magnetic poles of the stator, and the coil pitch of one of the spiral coils disposed on each side of the disc being different from those of the other coils on the side of the disc so as to provide a geometrically asymmetrical coil pattern.

2 Claims, 7 Drawing Figures

DISC ROTOR

The present invention relates to a disc rotor for use in an electric rotating machine, having spiral coils constructed through printed circuit technique.

A variety of such disc rotors have hitherto been proposed.

The an object of the present invention is to provide a disc rotor which is furnished with an armature winding having a specific printed pattern and a unique structure so as to achieve a high efficiency and strong torque.

For a better understanding of the present invention reference may be made to the accompanying drawings wherein the same reference numerals are applied to like parts and wherein.

Figure 1:
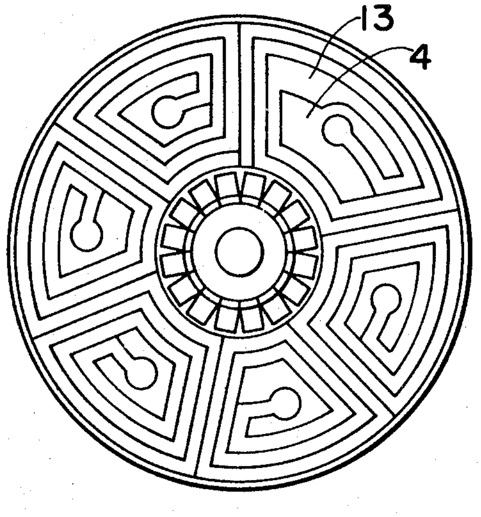
FIG. 1 is a top plan view of a disc rotor embodying the present invention.
Figure 2:
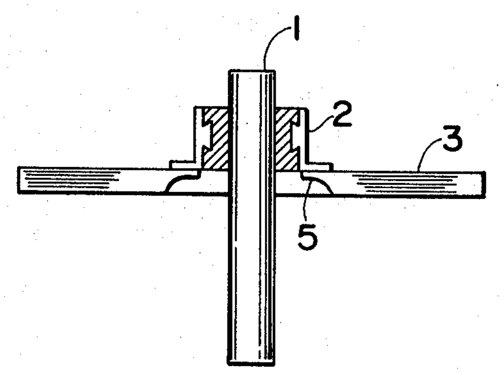
FIG. 2 is a cross sectional view of the disc rotor shown in FIG. 1.

Referring now to FIGS. 1 and 2, a disc rotor having a lamination of armature elements according to this invention and mounted on a rotor shaft 1, in which a commutator 2 and an armature winding 3 are connected together by way of a terminal 5 equivalent to a riser. The printed pattern of the armature winding 3 will be described later in detail, however, it should be noted that the coil 4 of the armature element has a greater pitch than the other five coils, as seen in FIG. 1.

Electric current is introduced into the armature winding 3 of the disc rotor by way of brushes and the rotor rotates in the stator field. The structures of the stator and the brushes associated with the disc rotor according to the invention are the same as those used in the conventional electric rotating machinery and therefore the description of the geometry of the parts is herein omitted.

Figure 3:
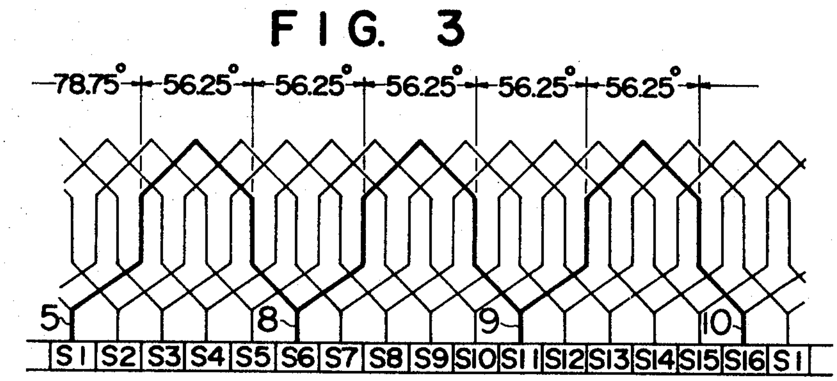
FIG. 3 is an electrical wiring diagram of the disc rotor in FIG. 1, the coils and the commutator segments of the rotor, i.e., the armature, in this case, being developed according to the drawing convention.

FIG. 3 shows a developed wiring diagram of the disc rotor of the invention. This disc rotor has six poles and a commutator comprising sixteen segments, and the armature winding of the disc rotor is a progressive wave winding and consists of spiral coils. For simplicity's sake an equivalent wiring diagram corresponding to the electrical connection among the armature coils of the disc rotor according to the invention is shown in FIG. 3. In FIG. 3 each of the sixteen armature coils is shown as having a single turn, but this is also for simplicity's sake and it should be noted that every armature coil may have a plurality of turns. It is also seen that although in FIG. 3 the armature winding is flatly distributed the actual distribution of the winding is circumferentially about the axis of the disc rotor. The present invention will be better understood if described in conjunction with this developed wiring diagram in FIG. 3. In FIG. 3, assume that the coils indicated by heavy line, i.e., coils contained in one round of wave winding, constitute one armature element and it is understood that the armature winding consists of six armature elements with the same coil pattern, each element being circumferentially displaced from an adjacent one by a distance equal to one segment of the commutator. Namely, the armature element I starts from the commutator segment $S_1$, passes through the segments $S_6$ and $S_{11}$, and terminates at the segment $S_{16}$. In like manner, the armature element II takes a cource $S_2 - S_7 - S_{12} - S_1$. Table 1 (given below) shows how the six armature elements are to be associated in connection respectively with the commutator segments. As to the segments $S_1$, $S_6$ and $S_{11}$, the armature elements I and VI

TABLE 1

| Armature Element | Numbers of segments for corresponding elements to be connected with |
|---|---|
| I | 1 – 6 – 11 – 16 |
| II | 16 – 5 – 10 – 15 |
| III | 15 – 4 – 9 – 14 |
| IV | 14 – 3 – 8 – 13 |
| V | 13 – 2 – 7 – 12 |
| VI | 12 – 1 – 6 – 11 |

are connected in parallel with each other, as seen in Table 1. In order to merely complete the armature winding, a coil connected only between the segments $S_{12}$ and $S_1$ may serve as the armature element VI. However, from the standpoint of decreasing the number of different components constituting the armature and balancing the armature in weight, it is preferable to employ six armature elements having the same winding pattern. Consequently, the armature elements I and VI will have commonly connected coils. This parallel connection will never degrade the operating characteristics of the resultant rotating machine but, on the contrary, improve the characteristics because of the resulting decrease in the armature winding resistance.

Figure 4:
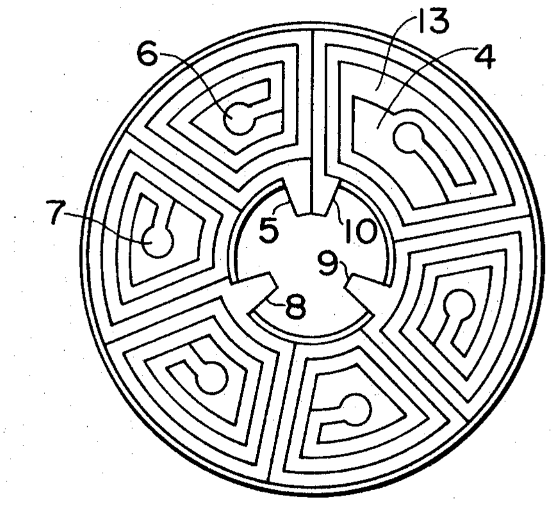
FIG. 4 shows one side of an armature element used in the disc rotor mentioned above.
Figure 5:
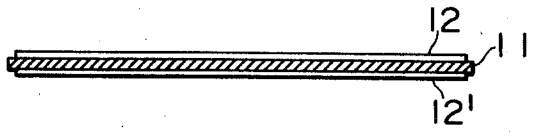
FIG. 5 shows a side view of the armature element shown in FIG. 4.
Figure 6:
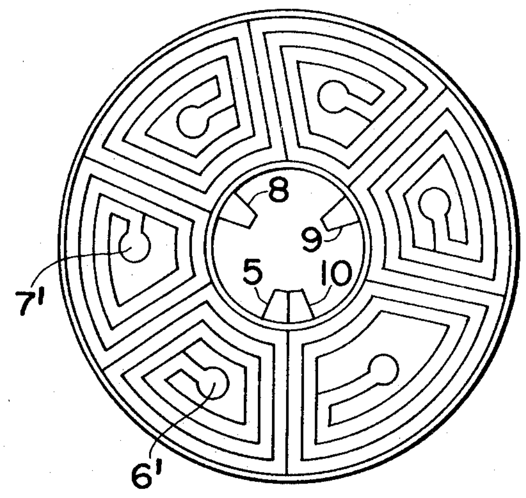
FIG. 6 shows the other side of the armature element shown in FIG. 4.

FIGS. 4 to 6 show in detail the armature element, in which spiral coils 12 and 12′ are formed through printed circuit technique respectively on both sides of a thin insulating film 11 having a shape of a disc. The number of the individual spiral coils on each side of the insulator film disc 11 is equal to that of the magnetic poles on the stator. In this invention, for example, a disc rotor is described which has six poles and sixteen commutator segments so that the above mentioned number is six. Near the center of the insulator film disc 11 are disposed terminals through which printed coils of the armature element are connected with corresponding commutator segments. The conductors constituting one armature element, starting from a terminal 5, from a first coil whose central terminal 6 is connected with the contral terminal 6′ of a second coil disposed on the opposite side of the insulator film disc 11 through a perforation in the disc and the second coil is connected in series with a third coil whose central terminal 7′ is connected with the central terminal 7 of a fourth coil through a perforation in the disc, which fourth coil is connected in series with a fifth coil provided with a terminal 8. The conductors proceed in a similar manner and finally reach a terminal 10 to complete a group of coils for the armature element. This group of coils as a whole constitute one round of the wave winding. The way of connecting the terminals 5 and 10 and the intermediate tap terminal 8 and 9 with the commutator is shown in FIG. 3. A disc rotor according to the invention will now be shown, which is built by mounting such six similar armature elements as described above on a shaft with an insulating film interposed between two adjacent elements which are relatively displaced circumferentially about the shaft by an angle equal to that subtended by one segment of the commutator with respect to the center axis of the shaft and by connecting the terminals of these armature elements with the corresponding segments of the commutator. In this embodiment the wave winding of the armature is composed of a plurality of armature elements which have the same coil pattern and each of which itself cannot complete the armature winding.

The feature of the coil pattern is that one of the spiral coils on each side of the armature element has a greater coil pitch than the other so as to provide geometrical asymmetry. And this artifice improves the efficiency and increases the torque of the disc rotor. For an armature will exhibit the highest efficiency and the greatest torque if the armature conductors are disposed in uniform angular spaces on the surfaces of the insulator film disc 11 and if the coil pitch of any individual coil is nearest a full pole pitch, or 180 electrical degrees. Therefore, the selection of the coil pitch should be taken into account. For a 6-pole disc rotor any armature element has 6 individual coils on either side of the insulator film disc 11. By setting the coil pitches of the six coils in such a manner that one coil has a pitch of 78.75° while the other five coils have a pitch of 56.25°, the resultant disc rotor, when assembled by stacking six armature elements of the same structure one upon another with an insulating film interposed therebetween, will have armature conductors well uniformly distributed about the center of rotation and a near full-pitch winding, as seen in FIG. 3. The coil pattern of the armature element in FIG. 4 is formed in this manner. The coil pattern of the armature winding for the conventional disc rotor was geometrically symmetrical. Namely, for a six pole rotor, six individual coils each having a pitch of 60° were disposed on either side of the disc to form an armature element. If a rotor is constructed by stacking one upon another armature elements having 60°-pitch coils like the conventional armature element in a manner according to the invention, then the armature conductors are not uniformly distributed about the center of rotation. As a result, the rotor will have a poor efficiency.

According to the present invention, a disc rotor can be provided which has an improved characteristics in comparison with the conventional one since the invention contemplates such a specific coil pattern and coil pitches as described above.

The adoption of the geometrically asymmetrical coil pitch will destroy the uniform distribution of mass or weight over the armature element, thus giving rise to oscillatory noises during the rotation of the disc rotor. In order to eliminate such a harmful effect, according to the invention, a counterweight is added to, for example, a portion of the coil 4 as in FIG. 4, the weight per unit area of which is lighter than those of the other coils, so as to render the distribution of mass over the armature element as a whole uniform.

The addition of such a counterweight is most easily performed by broadening the conductor forming the coil 4 along its entire length or only a portion thereof. In FIG. 4, the broadened portion 13 of the coil conductor is the counterweight. It is seen from FIG. 4 that the individual coil 4 has a greater pitch than the other individual coils. This is because in this case the armature winding is a non-crossed wave winding. On the other hand, with a crossed wave winding one of the individual coils has a smaller pitch than the other. Therefore, it may well be defined that one of the individual coils has a coil pitch different from those of the other in the coil pattern of the armature element for a disc rotor according to the invention.

Figure 7:
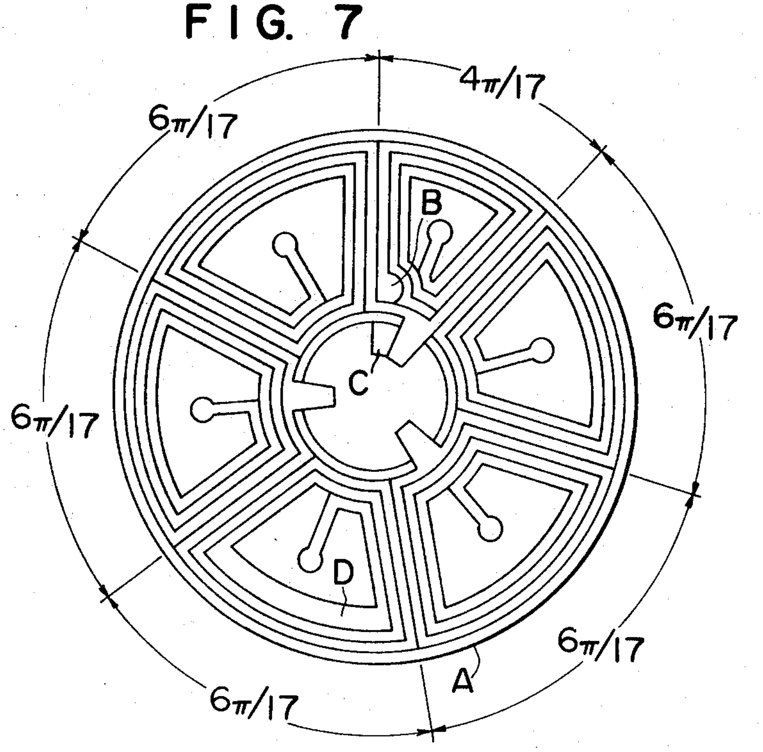
FIG. 7 is a top plan view of an armature element as another embodiment of the invention.

FIG. 7 shows a coil pattern for a crossed wave winding. In the coil pattern in FIG. 7, individual spiral coils are formed on both sides of a insulating film disc A. The terminating end of the coils is indicated at B and the terminal B is connected with a terminal C provided on the opposite side of the disc A through a perforation in the disc A. This artifice is especially necessary for a crossed wave winding since in case of crossed wave winding the initiating end and the terminating end of one round of the armature winding intersect each other. The portion of the coil conductor indicated at D, broader than the other portion, is formed to serve as a counterweight to render the mass distribution of the resultant disc rotor uniform. It is apparent from FIG. 7 that one of the six individual coils has a coil pitch of 4 $\pi/17$ radian while the other five coils have a pitch of $6\pi/17$ radian. Referring to Table 2 given below, one will have a coil pitch of $6\pi/17$ if one substitutes values 6 and 17 respectively for $p$ and S. The derivation of the formulas for determining optimum coil pitches is not given herein since it seem apparent to deduce such formulas from the foregoing description. However, from Table 2 given below it follows that for a disc rotor having six poles and 16 commutator segments, whose winding is a non-crossed wave winding, the coil pitch of any one of five similar coils is given by the expression $$[2(16-1)]/6 \cdot \pi/16 = (5\pi)/16 = 56.25°,$$

while the coil pitch of the remaining dissimilar coil is $$\{2(16-1)]/6+2\} \cdot \pi/16 = (7\pi/16 = 78.75°.$$

Consequently, the resultant armature element is like that shown in FIGS. 1 to 3.

TABLE 2

| | Non-crossed wave winding | Crossed wave winding |
|---|---|---|
| Pitch of any one of $p$−1 like coils (radian) | $2(S-1)/p \cdot \pi/S$ | $2(S+1)/p \cdot \pi/S$ |
| Pitch of one remaining dissimilar coil (radian) | $\{2(S-1)/p+2\} \cdot \pi/S$ | $\{2(S+1)/p-2\} \cdot \pi/S$ |

$p$ : number of poles
$S$ : number of commutator segments

As has heretofore been described, the present invention is explained by way of embodiments which are merely illustrative examples. However, it should be noted that the invention is by no means limited solely to those embodiments but that various modifications, variations and alterations are possible without departing from the spirit and scope of the invention.

What is claimed is:

1. A disc rotor having a wave winding comprising a shaft, a commutator consisting of a plurality of segments and a plurality of armature elements having the same coil patterns formed through printed circuit technique each of which constitutes one round of the wave winding, wherein said armature elements are stacked one upon another with an insulator film interposed between two adjacent elements and mounted on said shaft with each element displaced circumferentially from the adjacent one by an angle equal to that subtended by one segment of said commutator with respect to the center of said shaft, wherein the coil pattern on each side of any one of said armature elements consists of a plurality of component spiral coils whose number p is equal to that of magnetic poles on the stator, and wherein the coil pitches of $p-1$ coils of the $p$ coils on each side of said one armature element are all the same while the remaining one of said $p$ coils has a different coil pitch than the other so as to provide a geometrically asymmetrical winding pattern; the coil pitch for said $p-1$ coils being $[2(S-1)]/p \cdot \pi/S$ for non-crossed wave windings, or $[2(S+1)/p \cdot \pi/S$ for crossed wave windings, and the coil pitch for the remaining coil being $\{2(S-1)]/p + 2\}\pi/S$ for non-crossed wave windings, or $\{2(S+1)]/p - 2\}\pi/S$ for crossed wave windings, where S is number of commutator segments.

2. A disc rotor according to claim 1, wherein the conductor of one of said spiral coils disposed on each of said armature elements is made broader than that of any other coil on said side of said armature element along its entire length or a part thereof so as to render the mass or weight distribution of said armature element uniform.

* * * * *